June 6, 1961 S. TESZNER 2,987,659

UNIPOLAR "FIELD EFFECT" TRANSISTOR

Filed Feb. 13, 1956 5 Sheets-Sheet 1

S. TESZNER
INVENTOR
BY A. A. Lafftz
ATTORNEY

June 6, 1961 S. TESZNER 2,987,659

UNIPOLAR "FIELD EFFECT" TRANSISTOR

Filed Feb. 13, 1956 5 Sheets-Sheet 2

S. TESZNER
INVENTOR
BY A. A. [signature]
ATTORNEY

S. TESZNER
INVENTOR
BY [signature]
ATTORNEY

S. TESZNER
INVENTOR
BY A. A. Saffitz
ATTORNEY

UNIPOLAR "FIELD EFFECT" TRANSISTOR

Filed Feb. 13, 1956 5 Sheets-Sheet 5

S. TESZNER
INVENTOR
BY A. A. Saffitz
ATTORNEY

United States Patent Office 2,987,659

Patented June 6, 1961

2,987,659

UNIPOLAR "FIELD EFFECT" TRANSISTOR

Stanislas Teszner, 49 Rue de la Tour, Paris, France

Filed Feb. 13, 1956, Ser. No. 565,231
Claims priority, application France Feb. 15, 1955
8 Claims. (Cl. 317—235)

The subject matter of the present invention is a new unipolar field-effect transistor.

It is known that the transistors known at present are either of the "bipolar" transistor class or of the "unipolar" transistor class. In the "bipolar" transistors there is interaction between the mobile carriers of negative charges (electrons) and the mobile carriers of positive charges (holes). In the "unipolar" transistors, the mobile charge-carriers of the active part all have, in principle, charges of the same polarity.

The types of "bipolar" transistors most widely used at the present time are junction transistors of the p-n-p type and of the n-p-n type.

On the other hand, the development of unipolar field-effect transistors is quite recent. Now, they appear, a priori, to have more interesting possibilities than the bipolar transistors, particularly from the point of view of the utilisable frequency band width which is much greater for an output power of the same order or even of a higher order and of the values of their input and output resistances which are also much greater.

The principle which is common to all unipolar field-effect transistors consists in varying the resistance of a semi-conductive body under the action of a modulating electric field. It is, in fact, known that the resistance of a semi-conductive body can be modulated by an electric field. If a current is passed into this semi-conductor, the application of an electric field, which is transverse of the current, ensures a modulation of the latter. According to hypotheses accepted at present, this effect results from the formation of space charges from the surface to the interior of the semi-conductor. The extent of these charges is greater, all conditions being otherwise the same, the greater the intensity of the field at the surface of the semi-conductor. If the dimension of the semi-conductive body in the direction of the field is greater than the extent of the space charges, the semi-conductive body is electrically neutral outside these charges and the electric field is then practically zero there. It is thus seen that there is a reciprocal effect between the electric field and the space charges; the electric field produces the development of the charge and it is the extension of the latter which renders possible the development of the electric field. A difference of potential is formed between the exterior and the interior of the semi-conductive body.

In the unipolar transistors described by W. Shockley in "A Unipolar Field Effect Transistor" (Proceedings of the Institute of Radio Engineers, vol. 40, November 1952, pages 1365 to 1376) a thin plate, hereinafter called "core," of a semi-conductor of a given type, for example p-type germanium, of relatively high resistivity, approaching the intrinsic resistivity is covered, on one side and the other, by plates of a semi-conductive body of the same dimensions as the former plate but of opposite type, for example n-type germanium, and of relatively low resistivity owing to the inclusion of a high proportion of suitable impurities. Electrodes consisting of highly doped p-type germanium are deposited by ohmic contact at the ends of the core. It has been proposed to call the electrode from which the carriers start by the name of source electrode and the electrode at which the carriers are collected by the name of drain electrode in order to distinguish them from electrodes of vacuum tubes and from electrodes of bipolar transistors, the properties and the structure of the latter being quite different from those of unipolar field-effect transistors. These names will be employed hereinafter and the covering plates of the core will be called "gates."

The application of an electric voltage between the external semi-conductive plates and the core of the unipolar transistor in the reverse direction, that is to say in the direction in which the passage of current and consequently injection of minority carriers is practically prevented, produces the development of space charges in the semi-conductive layers adjacent to the n-p junctions. These space charges are developed over a depth which is a function of the magnitude of the electric field and, therefore, of the voltage applied to the gates. The density of the mobile charge-carriers becomes very small and a practically negligible conductivity results. This is equivalent to a reduction of the thickness, which is already very small, of the semi-conductive core. The part of the core between the space charges near the n-p junctions is called "channel."

The modulating effect of the gates in the known unipolar field-effect transistors is exerted in only one dimension of the core, namely on its thickness. Since the modulation is proportional only to the square root of the voltage applied to the gates, it is of relatively little effect. On the other hand, as the possible thickness of the space-charge zones is only a few tens of microns at the most, it is seen that the thickness of the core should, normally, not exceed the order of magnitude of .004 inch in order that the modulation of its active section may be appreciable. Now, the manufacture of a device comprising a plate, that is so thin and with a practically uniform thickness, of an almost intrinsic semi-conductor and covered with semi-conductive layers of the opposite type which are rich in impurities undoubtedly gives rise to great difficulties.

The object of the invention is to obviate all or, at least, part of the drawbacks indicated.

It has been observed by the applicant that unipolar transistors could be manufactured much more simply by replacing the system of n-p junctions between semi-conductive bodies, which is of a very complex construction in this particular case, by a metal-semi-conductor junction which is of a very much simpler construction. In fact, there is then developed, inside the semi-conductor, a natural layer called "surface barrier," which, as in the n-p junction, is characterised by a surface charge and a space charge which extends over a depth that depends on the voltage applied between the metal and the semi-conductor.

The space charge of this natural surface barrier extends up to the surface of the semi-conductor which comprises a surface charge of a sign opposite to that of the said space charge. On the other hand, in proceeding towards the interior of the semi-conductor, the density of the space charge is gradually compensated by the mobile charges of the carriers, the sign of which is also opposite to that of the space charge and the density of which increases until neutrality is reached.

The formation of the surface charge of the barrier surface is promoted by a suitable treatment of the surface of the semi-conductor and by a suitable method of depositing the metallic electrode as well as by the choice of the nature of the metal. Particulars concerning this will be given hereinafter in the description of practical methods of carrying out the invention.

It is also possible to produce the modulating field through an insulating layer between the semi-conductive body and the metallic gate. It is known in fact that layers of insulating materials such as varnishes of sufficiently small thickness interposed between a semiconductor surface and a metal surface which in the absence of said layer would have a rectifying contact preserves the rectifying nature of the contact (see, for example, Hartmann, "Physikalische Zeitschrift," vol. 37, 1936, page 862 and Stanislas Teszner, "Semi-conducteurs Electroniques et Complexes Derives" ed. Gauthier-Villars, 1950, page 16).

It has already been indicated that the modulation acting on the resistance of the semi-conductor in the known unipolar field-effect transistors had relatively little effect because the action of the electric field is exerted only along a single dimension of the semi-conductor. The applicant has conceived the idea of appreciably increasing the efficacy of the modulation by making the external electric field act over the whole section of the semi-conductor. This is obtained by giving the portion of the transistor that is acted upon by the gate and the gate itself a cylindrical shape of circular section. As the modulation by the electric field of the channel and, consequently, of the resistance of the semi-conductive body (and thus of the current which passes through for a given voltage) is more efficacious than, for the same difference of potential and the same type of semi-conductor, the extent of the space charges in relation to the total section of the semi-conductor is great, a unipolar field-effect transistor having a cylindrical configuration renders it possible to ensure a given degree of modulation for a difference of potential which is half the difference of potential which is necessary for the purpose of obtaining the same degree of modulation in the parallelepiped configuration hitherto used.

This advantage will be demonstrated hereinafter and other interesting features will be set forth and, at the same time, quantitative details will be given.

The invention will now be described in detail with reference to the accompanying drawings, of which:

Figure 1:
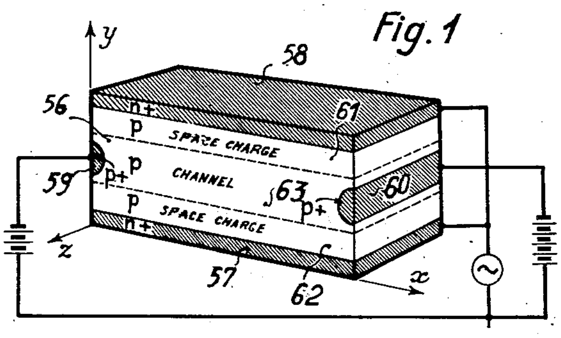
FIG. 1 is a diagrammatic representation of a known unipolar field-effect transistor.

FIG. 1 represents, for the purpose of a good understanding of the invention, a unipolar field-effect transistor of a known type. 56 is a layer of germanium of the p-type constituting the core of the transistor having a resistivity near the intrinsic resistivity. 57 and 58 are two layers of highly doped germanium of the n-type. 59 is the source electrode and 60 is the drain electrode, both electrodes being made of highly doped germanium of the p-type.

If a difference of potential is applied between the gates 57 and 58 and the drain electrode 60, space charges 61 and 62 are developed, which are situated principally in the core 56 and bound a channel 63, the section of which, along the $x$-axis, varies as a function of the difference of potential between the gates and the channel. It is seen that the section varies only in accordance with the $y$-axis, its thickness in accordance with the $z$-axis being constant.

According to the invention, the space charge region is no longer produced at the junction of two semi-conductive bodies of opposite-conductivity types but in the rectifying contact existing at the boundary of a metallic layer and of a layer of a semi-conductive body, if required separated by an insulator.

Figures 2, 3, 4:
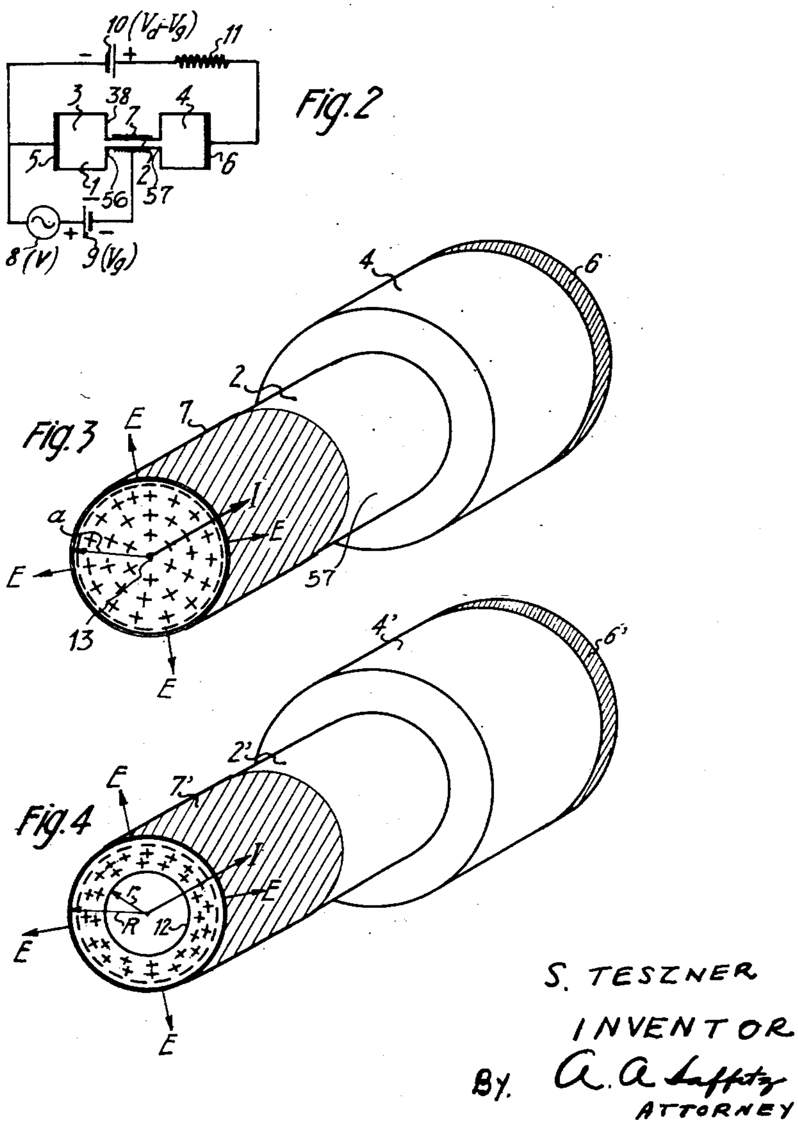
FIG. 2 represents a unipolar field-effect transistor according to the invention, connected as an amplifier.
FIGS. 3, 4 and 5 are diagrams of unipolar field-effect transistors, in which the active part, that is to say the part in which the channel is modulated, has, successively, a circular cross-section, an annular cross-section and a rectangular cross-section, these figures being intended to show the advantages of the circular cross-section.

In FIG. 2, the transistor, denoted in its entirety by 1, is constituted by a semi-conductive body of the n-type, for example, by germanium of the n-type. It comprises a substantially cylindrical part 2 of a small diameter and two lateral parts 3 and 4 which are also substantially cylindrical and are of a greater diameter, on the end faces of which there are arranged two metallic electrodes 5 and 6 which are in ohmic contact with the semi-conductive body. 5 is the source electrode which is equivalent to the cathode of a three-electrode thermionic valve and 6 is the drain electrode which is equivalent to the anode of such a valve. Round the narrow part 2 a controlling metallic electrode or gate 7 is arranged. It is to be noticed that gate 7 has a length lesser than the length of the thinned part 2, thus providing non-coated portions 56 and 57 of said thinned part which will be denoted in the following gap portions. The nature of the metal used for making the gate does not constitute an essential factor, but certain metals are more suitable than others; for germanium of the n-type, indium, tin, zinc, gold or platinum are particularly suitable. The surface of the semi-conductive body should be clean and regular and, in the case of a semi-conductor of the n-type, the formation of a layer of oxide, which facilitates the attachment of a negative charge on the surface, should be promoted there. It is known that a layer of oxygen promotes this formation. The surface may therefore advantageously be treated with an aqueous solution of hydrogen peroxide having a concentration of the order of 5 to 20% by weight, preferably with a small addition, of a fraction of one percent by weight, of sodium carbonate. This treatment is carried out at an elevated temperature, at about 60° C. for example.

8 is a generator of signals to be amplified, 9 and 10 are two sources of direct voltage, the former being for the bias of the gate and the latter being for feeding the drain electrode, and 11 is a load resistance. The voltage of the source 9 is $V_g$ and the voltage of the source 10 is $V_d - V_g$; the result of this is that the difference of potential between the gate and the drain electrode is $V_d$. The polarities of the sources 9 and 10 are indicated in the case of a semi-conductive body of the n-type. They would be reversed in the case of a semi-conductive body of the p-type. The signal supplied by the generator 8 modulates the resistance of the narrow portion of the transistor by varying the section offered to the passage of the current. The result of this is a variation of the current in the "source electrode-drain electrode" circuit and, consequently, a variation of the voltage at the terminals of the output resistance 11 where the input signal reappears greatly amplified.

Figure 5:
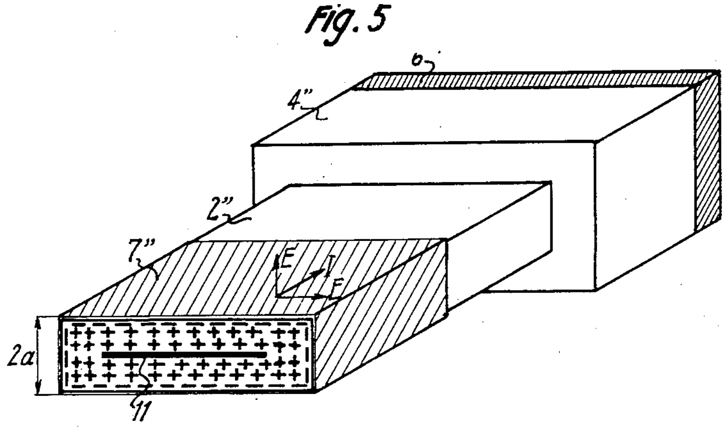

FIGS. 3, 4 and 5 represent at 2, 2' and 2'' respectively, the narrow portions of unipolar transistors in the cases in which these narrow portions have a cylindrical, tubular and parallelepiped configuration, that is to say in the cases in which their cross-sections are respectively circular, annular and rectangular. In all the cases, the transistors are constituted by the same semi-conductive body of the n-type and the narrow portions are surrounded by peripheral gates 7, 7' and 7'' respectively. The transistors are supposed to have been cut in their narrow portion and only their drain electrodes 6, 6' and 6'' respectively are seen. The drain electrodes and the gates are, in the three cases, polarized in relation to the source electrodes, as represented in FIG. 2. The arrows I represent the direction of the "source electrode-drain electrode" current and the arrows E represent the direction of the field inside the semi-conductor and resulting from the differences of potential between the three electrodes. The crosses show the positive space charges and the dashes show the likewise negative surface charges.

It is seen that, when the space charges invade the whole of the section (case of pinch off of the channel), the conducting channel is reduced to the portion of the plane 11 in the case of FIG. 5, to the cylindrical surface 12 in the case of FIG. 4 and to the axis 13 in the case of FIG. 3. It is seen at once that, for the same variation $\Delta E$ of the modulating field E, and therefore for the same variation $\Delta V$ of the alternating potential V of the gate, the variation of the active section of the channel in the neighborhood of the complete pinch off of this channel is undoubtedly more rapid in the FIG. 3 configuration than in those of FIGS. 4 and 5. Consequently, also, the effect of the modulation will be appreciably more marked, all other conditions being equal.

Hereinafter there will be given the approximate mathematical expressions of the current of the drain electrode as a function of the potentials of the electrodes and a corresponding graphical representation, but it will first be shown that the absolute value of the field and, consequently, that of the modulating potential, which are necessary for producing the complete pinching off, are twice as small in the FIG. 3 configuration as in those of FIGS. 4 and 5, the depths of the space charges being equal.

In fact, in the parallelepiped configuration, the field resulting from the surface charges and the space charges at a distance $x$ from the surface is given, with a sufficient approximation, by the expression $$E_x = \frac{AqN(l-x)}{K} \quad (1)$$

in which N is the density of the charge carriers (which, in the case of germanium of the n-type, in which the density of acceptors is negligible in practice, may be the same, at ordinary temperatures, as the density of donors $N_d$)

$q$ is the charge of an electron,
K is the dielectric constant of the semi-conductor,
$l$ is the depth of the space charge and
A is a constant, being a function of the chosen system of units, in particular equal to $4\pi$ in the c.g.s. system and to unity in the rationalised Giorgi system.

The electric field at the surface is equal to $$E_m = \frac{AqNl}{K} \quad (2)$$

In order that the space charge should invade the whole section (this corresponds to the complete pinch-off of the channel), it is obviously necessary that $l$ should be equal to $a$ where $a$ is half of the small side of the rectangle considered; this gives, for the surface field $E_o$, corresponding to this pinch-off $$E_o = \frac{AqNa}{K} \quad (3)$$

It is found in the same way for the surface field in the case of the tubular configuration $$E_o = \frac{AqN(R^2-r^2)}{2KR} \quad (4)$$

where R and $r$ are respectively the external radius and the internal radius of the tube, the other notations being the same as hereinbefore. The depth of the space charge that is necessary in order to obtain a complete pinch-off is here $(R-r)$ which is homologous with $a$ previously considered. By substituting $(R-r)=a$ in (4), it becomes $$E_o = \frac{AqN}{2K} a\left(2-\frac{a}{R}\right) \quad (5)$$

It is thus shown that, if the thickness $a$ of the tube is small in relation to R, the Expression 5 becomes practically identical with the Expression 3. This is the case of a relatively thin tubular layer. On the other hand, if $a=R$, as is the case of the cylindrical configuration shown in FIG. 3, the Expression 5 gives a value of $E_o$ which is twice as small as that given by the Expression 3.

It is the same for the values of the surface potential, that is to say of the voltage $V_o$ which has to be applied between the gate and the conductive channel in order to obtain the complete pinch-off of the latter. As the lateral non-thinned part 4 of the transistor has a resistance sharply smaller than the thinned part 2, the voltage between the gate and the point at which pinch-off occurs is approximately equal to the voltage which is applied between the gate and the drain electrode, this voltage is approximately equal to the sum of the voltage V, which is applied between the gate and the drain electrode, and of the potential barrier $F_m$ which is normally formed on the surface of the semi-conductor considered. However, for the relatively great voltages V which enter here and are to be taken into account, the expressions can be simplified by neglecting, as a first approximation, $F_m$ in front of V.

Thus, in the case of a rectangular section (FIG. 5), $$V_o = \frac{AqNa^2}{2K} \quad (6)$$

and, in the case of an annular section (FIG. 4), $$V_o = \frac{AqN}{2K}\left[\frac{(2r+a)}{2}a - r^2 \log_e \frac{r+a}{r}\right] \quad (7)$$

with $a=R-r$.

It is easily verified that, when $a$ is small in relation to R, the Expressions 6 and 7 give values of potential $V_o$ which are practically identical, whilst, when $a=R$, the Expression 7 gives a value of $V_o$ which is half of that given by 6.

Figure 6:
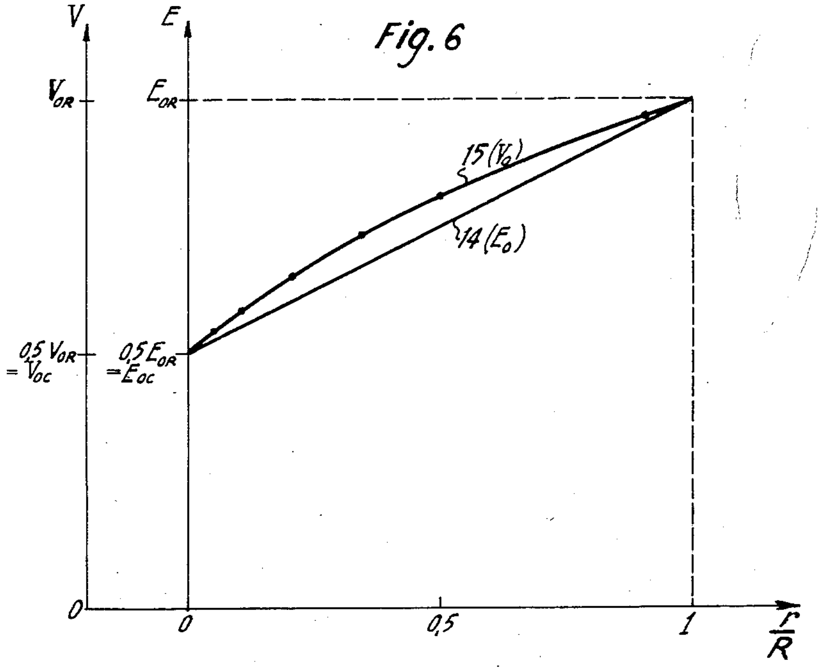
FIG. 6 represents curves giving the electric field and the potential to be applied to the gate of a tubular unipolar field-effect transistor in order to obtain the complete pinch-off of the channel as a function of the ratio between the internal and external radii of the tube.

FIG. 6 illustrates this demonstration by representing two curves 14 and 15 which show, respectively, the variation of $E_o$ given by the Expression 5 and the variation of $V_o$ given by the Expression 7 as a function of the ratio $r/R$, $E_{or}$ and $V_{or}$ being the values reached in the case of the rectangular section and $E_{oc}$ and $V_{oc}$ being the values reached in the case of the circular section. The remarkable advantage which is obtained by the cylindrical or practically cylindrical configuration can be clearly seen from this. By the term "practically cylindrical" is to be understood a polygonal section, of which the sides of the polygon are sufficiently small for the distance of any point of the perimeter from the centre of the polygon to be the same at about the accuracy of construction.

The cylindrical configuration also gives other advantages. It will first of all be observed that, in this configuration, it is possible either to reduce the modulating voltage V, which is applied to the gate of the transistor to half the value of that necessary in the case of a transistor made of the same semi-conductor (having the same value of N) but having a parallelepiped configuration the half-thickness $a$ of which is equal to the radius R of the transistor of cylindrical configuration or, for equal values of V for the two configurations to use a semi-conductor having a value of N which is twice that of the foregoing value, all other characteristics being otherwise equal. The conductance of the channel is thus approximately doubled; this gives, as will be seen hereinafter, at equality of section of the channel, a transconductance which is twice as great.

On the other hand, W. Shockley, in the aforesaid article, deduced, for the case of a rectangular section of the transistor, the following approximative formula giving the drain current $I_d$ as a function of the drain voltage $V_d$ with respect to the gate and of the gate voltage $V_g$ with respect to the source electrode:

$$(8)\qquad I_d=\frac{g_o}{L}\left\{V_d\left[1-\frac{2}{3}\left(\frac{V_d}{V_o}\right)^{1/2}\right]-V_g\left[1-\frac{2}{3}\left(\frac{V_g}{V_o}\right)^{1/2}\right]\right\}$$

where $g_o$ is the conductance of the channel per unit of length and L is the length of the channel, this expression being valid for $V_d$ and $V_g$ which are less than or equal to $V_o$.

An analogous expression is easily deduced for the case of a circular section, at equality of section, account being taken, on the other hand, of the fact that, for the same voltage $V_o$, the conductance of the channel per unit of length is here, as has just been stated, twice as great and therefore equal to $2g_o$:

(9)

$$I_d=\frac{2g_o}{L}\left\{V_d\left[1-\frac{4}{3}\left(\frac{V_d}{V_o}\right)^{1/2}+\frac{V_d}{2V_o}\right]-V_g\left[1-\frac{4}{3}\left(\frac{V_g}{V_o}\right)^{1/2}+\frac{V_g}{2V_o}\right]\right\}$$

Figure 7:
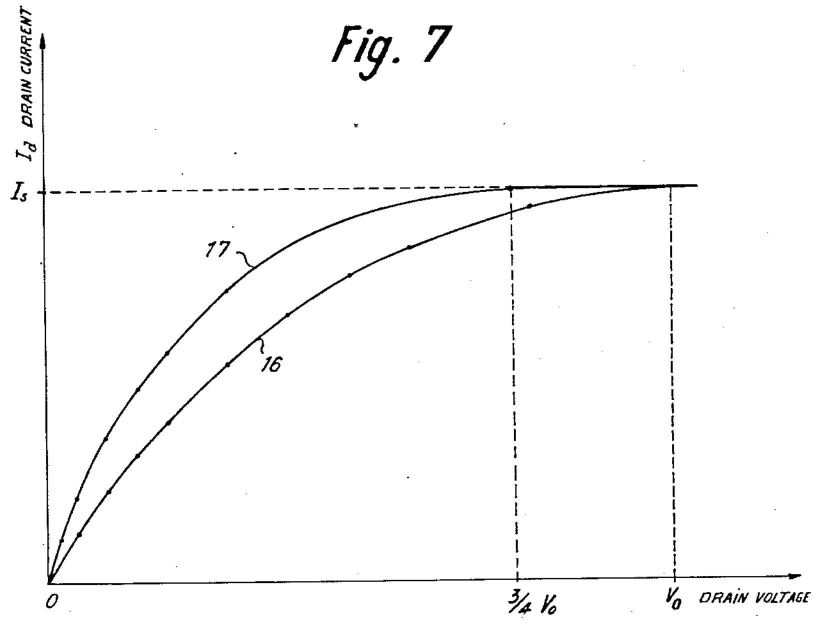
FIG. 7 represents curves giving the drain current as a function of the drain voltage in the case in which the active part of the transistor has, respectively, a rectangular cross-section and a circular cross-section.

FIG. 7 gives a graphic comparison of the "current-voltage" characteristics of the drain electrode for the parallelepiped configuration (curve 16) and for the cylindrical configuration (curve 17) in the case in which $V_g=0$, that is to say in the case in which the gate is directly connected to the source electrode.

The transconductance is given by the following expression:

(10)

$$g_m=\left(\frac{\partial I_d}{\partial V_g}\right)_{V_d-V_g=\text{Cnst}}=\frac{2g_o}{L}\left\{\left[1-2\left(\frac{V_d}{V_o}\right)^{1/2}+\frac{V_d}{V_o}\right]-\left[1-2\left(\frac{V_g}{V_o}\right)^{1/2}+\frac{V_g}{V_o}\right]\right\}$$

The maximum value of the transconductance corresponds to $V_g=0$ and $V_d=V_o$. It is equal, except for the sign, to $$(g_m)_{max}=\frac{2g_o}{L}$$

which is a value that is twice that which corresponds to the parallepiped configuration (see "Unipolar Field Effect" Transistor, by G. C. Dacey and I. M. Ross, Proceedings of the Institute of Radio-Engineers, August 1953, page 971, Formula 7.

It is easily observed that the value of *gm* is, in practice, kept for a wide range of values $V_d$ which are less than $V_o$; this is an appreciable advantage in relation to the case of the parallelepiped configuration. The value of $(g_m)_{max}$ is also equal to $$\frac{\partial I_d}{\partial V_g}$$

for $V_g=0$ and, consequently, to the slope at the beginning of the curve 17 of FIG. 7.

On the other hand, it is shown that the ratio of the resistances $$\frac{V_d}{I_d}$$

for $V_d=0$ and for $V_d=V_o$ is six in the first case (curve 17) as against three in the second case (curve 16) and, finally, that, in the first case, the saturation current $I_s$ (FIG. 7) is, in practice, reached when $V_d\approx\frac{3}{4}V_o$ whilst it is reached only from $V_d=V_o$ in the second case. The curve "$I_d-V_d$" of the cylindrical configuration (curve 17) is thus very nearly that of a pentode, which, as is known, is characterised by an extremely high amplifying factor.

Figure 8:
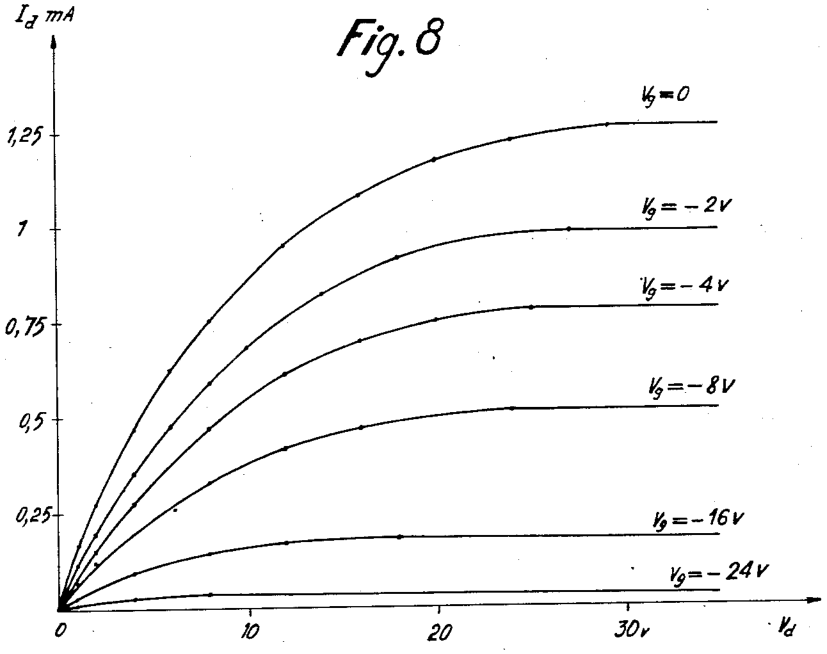
FIGS. 8 and 9 represent respectively the characteristic curves of a transistor according to the invention giving the variation of the drain current as a function of the drain voltage and the characteristic curves giving the variation of the drain current as a function of the gate voltage.
Figure 9:
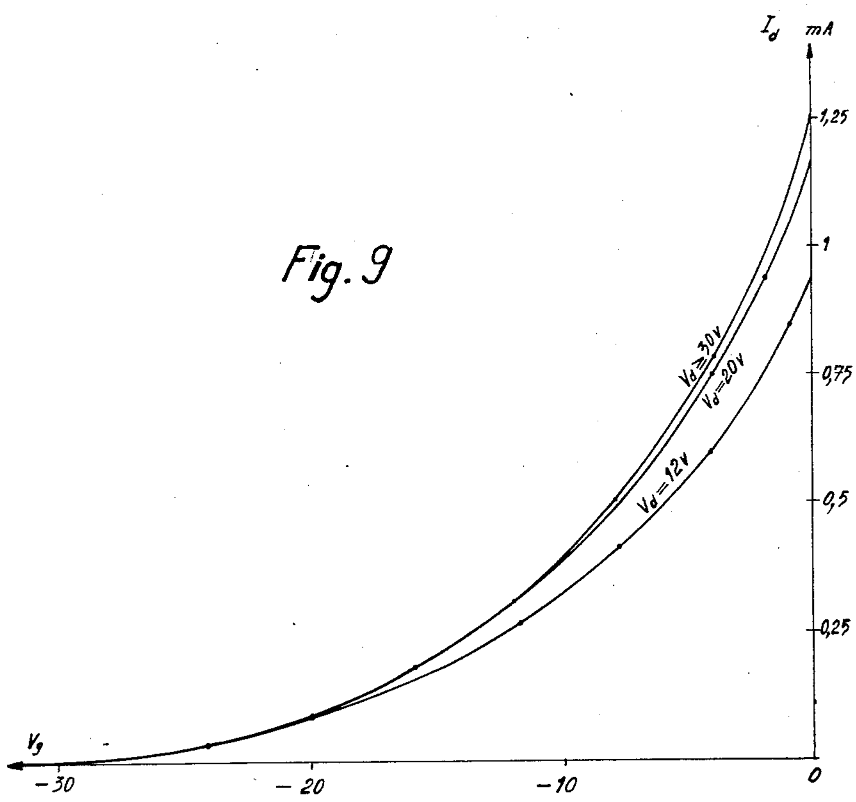

This observation is confirmed by the characteristics given on FIGS. 8 and 9, which are drawn by way of indication and relate to a transistor according to the invention, the data of which are the following:

Constituent material: germanium of the type n, with $N=1.6\ 10^{14}$ per cubic centimeter;

Diameter of the narrow part $\Phi=.002$ inch, from which $V_o=40$ volts;

Length of the channel: $L=.006$ inch

FIG. 8 represents the characteristics "$I_d-V_d$" and FIG. 9 represents the characteristics "$I_d-V_g$."

It is observed that the curves "$I_d-V_g$" for different values of $V_d$ are at the same position starting from $V_d=30$ volts; this confirms the extremely high value of the amplifying factor when the complete pinch-off of the conductive channel is approached, since this amplification factor $$\frac{dV_d}{dV_g}$$

of the channel is inversely proportional to the distance between two curves "$I_d-V_g$" corresponding to given values of $V_d$.

On the other hand, the transconductance is relatively high for a transistor of such very reduced dimensions. The power may reach the order of 250 mw. and the gain of power in the low frequency band is of the order of 40 db. The transconductance and the power may, in addition, be increased in practice as desired by putting the transistors into parallel. It is to be noted that the limiting utilisation frequency, which, as is known, depends upon the product $R_dC_g$ (where $R_d$ is the "source electrode-drain electrode" resistance and $C_g$ is the "gate-drain electrode" capacity) and which may reach the order of 300 mc./s. is not affected by this placing in parallel, since the resistance is divided by the number of transistors in parallel and the capacity is multiplied by this number.

Dimensional and electrical characteristics of field-effect transistors according to the invention will now be given.

Length of the rod: 0.1 inch.
Diameter of the non-thinned part: 0.025 inch.
Diameter of the narrow part: .002 to .006 inch.
Length of this narrow part: .004 to .016 inch.
Length of the gate electrode: .003 to .015 inch.
Voltage $V_d-V_g$ between the source and the drain: 40 volts.
Voltage between the gate and the source: 3 volts.
Input resistance between the gate 7 and the drain 6: approximately 25 megohms under 43 volts.
Input resistance between the gate 7 and the source 5: approximately 3 megohms under 3 volts.
Output resistance between the source 5 and the drain 6: approximately 45,000 ohms under 40 volts.
Power amplification factor: 33 db.
Dissipating power: 50 milliwatts.
Limit frequency of utilisation: 50 mc./s.

Figure 10:
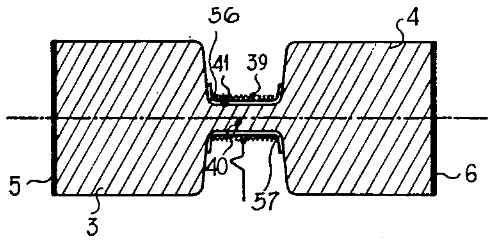
FIG. 10 represents a modification of a unipolar field-effect transistor according to the invention.

FIG. 10 shows a modified embodiment in which there is interposed, between the metallic layer 39, that forms the gate electrode, and the narrow part 40 of the semiconductive body, an insulating film 41, for example a layer of ethoxylinic resin, for example of the resin known under the trademark "Araldite D," which is liquid at room temperature, the said film having a thickness of the order of .0005 inch and being projected at a temperature lower than 100° C. It is to be noticed that, whereas the length of gate 39 is smaller than the semiconductor narrow part 40, the film 41 is as long as said part and coats the semiconductor wall in the gap portions 56 and 57. The gate is then deposited by a jet or by evaporation in vacuo of an alloy having a low melting point, for example of the alloy called Wood's alloy, the composition of which is the following: 50% Bi, 25% Pb, 12.5% Sn and 12.5% Cd (melting point 65.5° C.). Such a film preserves the rectifying nature of the gate-semiconductor contact and has the effect of reducing still further the gate-drain and the gate-source capacities and to increase the service voltage of the transistor. The diameter of the neck may then be brought to about 0.12 inch. On the other hand, this film diminishes the efficiency of the modulating voltage and thus reduces the amplification factor.

Every transistor according to the invention should, on the one hand, be strengthened mechanically and, on the other, be protected from external influences (damp, dust, etc.). A number of arrangements may be used for effecting this protection.

Figure 11:
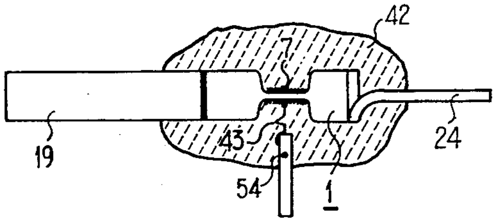
FIGS. 11 and 12 represent unipolar field-effect transistors of the invention, connected inside frames or supports.

In FIG. 11, the transistor 1, provided with its solid electrode 19 and with the nickel loop 24, is embedded in a small quantity of resin 42, preferably a resin which sets at room temperature, for example the resin called "Araldite D." Before the transistor is embedded, a connecting wire 43, of gold for example, of a diameter of .001 to .002 inch, is welded by electric discharge to the metallic deposit which forms the gate 7.

Figure 12:
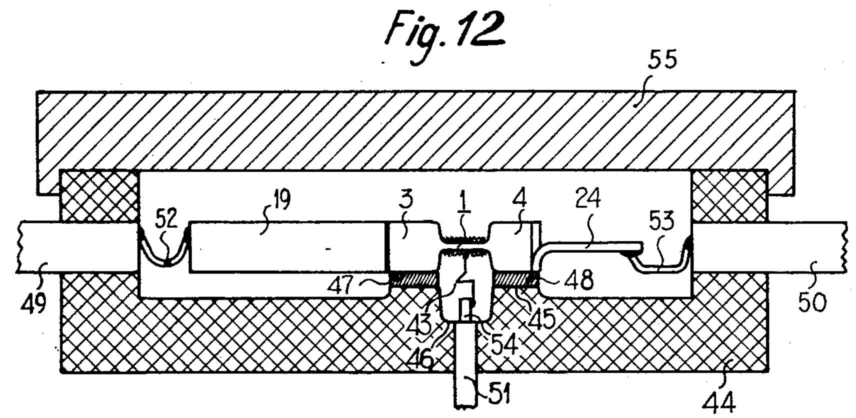

However, it will be more advantageous for the good preservation of the characteristics of the transistor, to enclose it, as shown in FIG. 12, in an air-tight case 44 filled with an inert gas, for example with argon or, if required, with nitrogen.

This case 44 is made of insulating material, for example of ethoxylinic resin, and it comprises, inside it, a suitably arranged boss 45 having a bed 46 at its central part. Arranged on the surface 45 are pads 47 and 48 of resin, preferably a resin which sets at room temperature, such as the aforesaid resin "Araldite D." The wide parts 3 and 4 of the transistor 1 are placed on these pads. The base of the case comprises three terminals 49, 50 and 51 to which are soldered flexible connections 52, 53 and 54 which are themselves soldered, at their other ends, to the electrode 19, the loop 24 and the gate wire 43.

The case comprises a lid 55 which is soldered, over its whole periphery, to the body of the case. This lid is provided with an orifice (not shown) which is used for creating a vacuum inside the case and for filling it with an inert gas, this orifice being closed at the end of the filling operation.

Although, in the foregoing, germanium and silicon are mentioned as semi-conductive bodies, the unipolar transistor of the invention may be formed of an intermetallic compound of groups III and V of the periodic classification of the elements.

What I claim is:

1. A unipolar field-effect transistor comprising a cylindrical channel region of semiconductive material, source and drain cylindrical semiconductive regions integral with said channel region and coaxial thereto, ohmic connections on the end faces of said source and drain cylindrical regions and an annular metallic layer-shaped gate region surrounding said cylindrical channel region and forming a rectifying contact therewith, said channel region having a predetermined diameter related to the carrier density of said material and substantially smaller than the diameter of the source and drain cylindrical regions, whereby the effective channel is centripetally constricted and reduced to one axis at least at its drain extremity.

2. A unipolar field-effect transistor comprising a cylindrical channel region of semiconductive material, source and drain cylindrical semi-conductive regions integral with said channel region and coaxial thereto, ohmic connections on the end faces of said source and drain cylindrical regions, said cylindrical channel region having a predetermined diameter related to the carrier density of said material and substantially smaller than the diameter of the source and drain cylindrical regions, and an annular metallic layer-shaped gate region surrounding said cylindrical channel region and forming a rectifying contact therewith, said gate region having a length smaller than the length of the channel region, whereby the effective channel is centripetally constricted and reduced to one axis at least at its drain extremity and stray capacity between the gate region and the source and drain region is substantially canceled.

3. A rod-shaped unipolar field-effect transistor comprising two cylindrical non-thinned semiconductive end portions, a cylindrical thinned semiconductive portion integral with said end portions, coaxial thereto and inserted therebetween and delimiting therewith transition flanged semiconductive portions, an annular metallic layer surrounding said cylindrical thinned portion, along a length which is less than that of said thinned portion and defining a rectifying contact therewith, gaps between the edges of said annular metallic layer and said flanged portions and circular metallic layers deposited on the end faces of said non-thinned portions and having ohmic contact therewith whereby the stray capacity between the metallic layer and the semiconductive end portions is substantially canceled.

4. A unipolar field-effect transistor comprising a cylindrical semiconductive channel region, source and drain connections, a metallic gate means surrounding said channel region to operate a centripetal pinch-off uniformly on all of the perimeter of said region and an insulating film inserted between said cylindrical channel region and said gate means, whereby an effective channel reduced to one axis is formed at least at the drain extremity of the channel region.

5. A unipolar field-effect transistor comprising a cylindrical channel region of semiconductive material, having a predetermined diameter related to the carrier density of said material, source and drain connections, an annular metallic gate region surrounding said cylindrical channel region and an insulating film inserted between said cylindrical channel region and said annular gate region, said channel region, insulating film and gate region together constituting a rectifying contact, whereby the effective channel is centripetally constricted and reduced to one axis at least at its drain extremity.

6. A unipolar field-effect transistor comprising a cylindrical channel region of semiconductive material, source and drain cylindrical semiconductive regions integral with said channel region and coaxial thereto, ohmic connections on the end faces of said source and drain cylindrical regions, an annular metallic layer-shaped gate region surrounding said cylindrical channel region, said channel region having a predetermined diameter related to the carrier density of said material which is substantially smaller than the diameter of the source and drain cylindrical regions, and an insulating film inserted between said cylindrical channel region and said annular gate region, said channel region, insulating film and gate region together constituting a rectifying contact whereby the effective channel is centripetally constricted and reduced to one axis at least at its drain extremity.

7. A unipolar field effect transistor comprising a cylindrical channel region of semiconductive material, source and drain cylindrical semiconductive regions integral with said channel region and coaxial thereto, ohmic connections on the end faces of said source and drain cylindrical regions, an annular metallic gate region surrounding said cylindrical channel region, said channel region having a predetermined diameter related to the carrier density of said material and substantially smaller than the diameter of the source and drain cylindrical regions, and an insulating film inserted between said cylindrical channel region and said annular gate region, said channel region, insulating film and gate region together constituting a rectifying contact whereby the effective channel is centripetally constricted and reduced to one axis at least at its drain extremity and the stray capacity between the gate region and the source and drain regions is substantially canceled.

8. A rod-shaped unipolar field-effect transistor comprising two cylindrical non-thinned semiconductive end portions, a cylindrical thinned semiconductive portion integral with said end portions coaxial thereto and inserted therebetween and delimiting therewith transition flanged semiconductive portions, an annular metallic layer surrounding said cylindrical thinned portion along a length which is less than that of said thinned portion, gaps between the edges of said annular metallic layer and said flanged portions, an insulating film inserted between said metallic layer and said thinned semiconductive portion and coating said gaps, said thinned semiconductive portion, insulating film and annular metallic layer together constituting a rectifying contact and circular metallic layers deposited on the end faces of said non-thinned portions and having ohmic contact therewith whereby the stray capacity between the metallic layer and the semiconductive end portions is substantially canceled.

References Cited in the file of this patent

UNITED STATES PATENTS

| | | |
|---|---|---|
| 2,524,034 | Brattain et al. | Oct. 3, 1950 |
| 2,569,347 | Shockley | Sept. 25, 1951 |
| 2,582,850 | Rose | Jan. 15, 1952 |
| 2,648,805 | Spenke et al. | Aug. 11, 1953 |
| 2,746,121 | Anderson | May 22, 1956 |
| 2,755,536 | Dickinson | July 24, 1956 |
| 2,776,381 | Baldwin | Jan. 1, 1957 |
| 2,778,956 | Dacey et al. | Jan. 22, 1957 |
| 2,784,478 | Slade | Mar. 12, 1957 |
| 2,805,397 | Ross | Sept. 3, 1957 |
| 2,836,797 | Ozarow | May 27, 1958 |